(12) United States Patent
Kastner et al.

(10) Patent No.: US 9,163,673 B2
(45) Date of Patent: Oct. 20, 2015

(54) METHOD FOR PRODUCING A COUPLING SEGMENT OF A FLEXIBLE COUPLING

(75) Inventors: Torsten Kastner, Datteln (DE); Gunnar Goedecke, Herdecke (DE)

(73) Assignee: Hackforth GmbH, Herne (DE)

( * ) Notice: Subject to any disclaimer, the term of this patent is extended or adjusted under 35 U.S.C. 154(b) by 0 days.

(21) Appl. No.: 13/994,264

(22) PCT Filed: Dec. 16, 2011

(86) PCT No.: PCT/EP2011/006385
§ 371 (c)(1),
(2), (4) Date: Jun. 25, 2013

(87) PCT Pub. No.: WO2012/079772
PCT Pub. Date: Jun. 21, 2012

(65) Prior Publication Data
US 2013/0281219 A1      Oct. 24, 2013

(30) Foreign Application Priority Data

Dec. 17, 2010   (DE) .......................... 10 2010 055 018

(51) Int. Cl.
| | |
|---|---|
| *B23P 17/00* | (2006.01) |
| *F16D 3/72* | (2006.01) |
| *F16D 3/74* | (2006.01) |
| *B32B 37/16* | (2006.01) |
| *B32B 38/00* | (2006.01) |

(52) U.S. Cl.
CPC . *F16D 3/72* (2013.01); *B32B 37/16* (2013.01); *B32B 38/0004* (2013.01); *F16D 3/74* (2013.01); *F16D 2250/00* (2013.01); *Y10T 156/1062* (2015.01)

(58) Field of Classification Search
CPC ....... B32B 37/16; B32B 38/0004; F16D 3/72; F16D 3/74; F16D 2250/00; Y10T 156/1062

USPC ............... 464/17, 92–96; 29/412; 83/53, 177; 451/40

See application file for complete search history.

(56) References Cited

U.S. PATENT DOCUMENTS

| | | | | |
|---|---|---|---|---|
| 5,111,652 | A | * | 5/1992 | Andre ........................... 83/53 X |
| 6,953,399 | B2 | * | 10/2005 | Kirschey ........................ 464/92 |
| 2002/0082091 | A1 | | 6/2002 | Walter et al. |

FOREIGN PATENT DOCUMENTS

| | | |
|---|---|---|
| DE | 202 12 204 U1 | 12/2003 |
| DE | 20 2007 001430 | 3/2007 |

OTHER PUBLICATIONS

International Search Report of PCT/EP2011/006385, mailed Apr. 24, 2012.
International Preliminary Report on Patentability of PCT/EP2011/006385, Jun. 18, 2013.

\* cited by examiner

*Primary Examiner* — Gregory Binda
(74) *Attorney, Agent, or Firm* — Collard & Roe, P.C.

(57) ABSTRACT

The invention relates to a method for the production of a coupling segment (11) of a segmented, elastic coupling (10), wherein an elastomer body (2) is disposed between two metallic connection flanges (3, 4), and the elastomer body (2) is connected with the two connection flanges (3, 4) in material-fit manner, by means of vulcanization, to form a coupling body (1). In order to be able to produce such a segmented, elastic coupling (10) at the lowest possible costs, it is proposed, with the invention, that the coupling segment (11) is cut out from the coupling body (1) by means of water jet cutting, wherein the water jet cuts the elastomer body (2) and, at the same time, at least one of the two connection flanges (3, 4).

12 Claims, 4 Drawing Sheets

- PRIOR ART -

METHOD FOR PRODUCING A COUPLING SEGMENT OF A FLEXIBLE COUPLING

CROSS REFERENCE TO RELATED APPLICATIONS

This application is the National Stage of PCT/EP2011/006385 filed on Dec. 16, 2011, which claims priority under 35 U.S.C. §119 of German Application No. 10 2010 055 018.3 filed on Dec. 17, 2010, the disclosure of which is incorporated by reference. The international application under PCT article 21 (2) was not published in English.

BACKGROUND OF THE INVENTION

1. Field of the Invention

The invention relates to a method for the production of a coupling segment of a segmented, elastic coupling, wherein an elastomer body is disposed between two metallic connection flanges, and the elastomer body is connected with the two connection flanges in material-fit manner, by means of vulcanization, to form a coupling body.

The invention furthermore relates to a segmented, elastic coupling having at least two coupling segments, which can be connected with one another to form the coupling.

2. Description of the Related Art

A segmented, elastic coupling is known, for example, from DE 202 12 204 U1, in the form of a segmented, rotationally elastic shaft coupling. This has two segments that can be connected with one another for the production of the segmented, rotationally elastic shaft coupling. Each segment has two metallic connection flanges, referred to as segment plates in the cited reference, which are connected with an elastomer body disposed between them, by means of vulcanization, with material fit. The connection flanges or segment plates are conventionally cut out from sheet-metal material.

Such a segmented, rotationally elastic shaft coupling is used, for example, in a torque-transferring drive train between an engine and a work machine, in order to damp rotational vibrations within the drive train. A typical application case is the drive train of a ship, between engine and propeller. In this connection, the rotationally elastic shaft coupling is flanged onto the adjacent machine elements, such as, for example, onto the flywheel of an engine or onto a shaft, with its drive flange or with its power take-off flange. Furthermore, such a segmented, rotationally elastic shaft coupling can balance out a radial and axial offset of individual sections of the drive train relative to one another. For example, the transmission of a ship is generally mounted in fixed manner, while the ship diesel is mounted elastically. The offset of the engine caused by vibrations and hull deformations is compensated by means of a segmented, rotationally elastic shaft coupling that is disposed between engine and transmission.

Such a segmented, rotationally elastic shaft coupling has multiple advantages as compared with a non-segmented, rotationally elastic shaft coupling. For example, for one thing, additional design-technology degrees of freedom occur. Furthermore, segmented, rotationally elastic shaft couplings having large dimensions can be brought to the location of use, in each instance, in disassembled form, installed there, and also be easily removed and transported away again.

With regard to the production of segmented, rotationally elastic shaft couplings, it should be stated that a customer-oriented individual design of the shaft couplings, particularly with regard to the number of segments desired, in each instance, and their dimensioning per shaft coupling, is very cost-intensive, because the segments conventionally have to be produced separately from one another, and a separate production process must be made available for every dimensioning of the segments.

SUMMARY OF THE INVENTION

Proceeding from this, it is the task of the invention to create a novel method for the production of a coupling segment of a segmented, elastic coupling, with which the production costs of such couplings can be clearly reduced.

This task is accomplished, proceeding from a method of the type stated initially, in that the coupling segment is cut out from the coupling body by means of water jet cutting, whereby the water jet cuts the elastomer body and, at the same time, at least one of the two connection flanges.

According to the invention, coupling segments having the most varied configurations can be produced in simple and therefore more cost-advantageous manner, in that a coupling segment with a desired shaping is simply cut out by means of water jet cutting, from the coupling body, which forms a blank. It is not necessary to make available an individual production process and the production means used in it for every individual shaping of a coupling segment, which would be connected with high costs. It is sufficient, for example, to produce a uniform blank having a specific dimension, from which at least one coupling segment having a desired shaping can be cut out.

By means of the great shape variety of coupling segments that can be produced, which can be achieved with the invention, it is furthermore possible to make available segmented, elastic couplings having the most different possible configurations, which couplings can be composed of these coupling segments.

Water jet cutting has proven to be particularly advantageous for cutting out the coupling segment, because no increased cutting temperatures occur during water jet cutting, which would have a negative effect on the properties of the elastomer body and on the connection regions between the connection flanges and the elastomer body.

Water jet cutting can be carried out in the form of pure water jet cutting, in which solely the jet energy of the water is utilized. However, a cutting agent (abrasive) can also be added to the water, such as, for example, garnet or corundum, in order to increase the cutting power.

By means of water jet cutting, cuts having the most varied possible configurations can be made, which allows very individual and nevertheless cost-advantageous production of coupling segments. The two connection flanges can also be cut at the same time with the elastomer body.

An advantageous embodiment of the invention provides that the metallic connection flanges are produced in advance, at least in part, using a casting method. This advantageous because the metallic connection flanges produced, in part or completely, using a casting method, can be produced with low production tolerances. The quality of a coupling segment equipped with such connection flanges is clearly improved as compared with those in which the connection flanges are produced, proceeding from sheet metal, by means of forming methods, which also holds true for a segmented, elastic coupling formed from such coupling segments. According to this embodiment of the invention, connection flanges can also be made available that comprise a resilient cast part and a connection part connected with the latter, cut out from a steel plate and having a flat configuration.

According to another advantageous embodiment of the invention, at least one ventilation opening that runs through the entire coupling element is formed on the coupling segment, by means of water jet cutting, which opening extends from one connection flange to the other. The positioning of the ventilation opening can be individually varied, in simple manner, using water jet cutting, without thereby noticeably increasing the production costs. The number of ventilation openings in the coupling segment can also be individually varied in this way, without high cost expenditure. Furthermore, the size and shape of the ventilation openings can be individually varied in simple manner. This improves the freedom of design. In the case of conventional coupling segments, in contrast, the placement of such ventilation openings must take place during the separate production of these coupling segments, and this is accompanied by high production costs.

According to another advantageous embodiment of the invention, an elastomer body configured in ring shape and two metallic connection flanges configured in ring shape are used, and disposed coaxial to one another, whereby a shaft coupling that is rotationally elastic and configured in ring shape is formed as a coupling body, by means of vulcanization. Thus, a non-segmented, rotationally elastic shaft coupling configured in ring shape is formed, at first in essentially conventional manner, which coupling is subsequently broken down into a desired number of separate coupling segments by means of water jet cutting. The individual coupling segments do not have to be produced by means of expensive, separate production processes, as known from the state of the art. Instead, the non-segmented, rotationally elastic shaft coupling is produced in a single method procedure, and afterward, cutting up of this shaft coupling by means of water jet cutting takes place in a second work step. In this connection, the rotationally elastic shaft coupling can be broken down into almost any desired number of coupling segments, without thereby causing the production costs to noticeably increase. By means of the method according to the invention, segmented, rotationally elastic shaft couplings having the most varied configurations can therefore be produced using essentially the same method steps. This allows establishing very cost-efficient production of rotationally elastic shaft couplings.

According to another advantageous embodiment of the invention, the coupling segment is formed by means of at least two radial cuts on the rotationally elastic shaft coupling configured in ring shape. However, other cut directions and non-straight cuts, in some manner, are also possible according to the method according to the invention, depending on the requirements and the customer's wishes, without thereby increasing the production costs of a segmented, rotationally elastic shaft coupling.

In a preferred embodiment of the method according to the invention, the connection flanges have recesses through which the elastomer body passes. The recesses are filled by the elastomer body during the vulcanization process, so that in the finished coupling segment, the elastomer body ends flush with the surface of the connection flange in the region of the recesses, for example. Preferably, the said recesses are radial slits closed on the end side. The cutting line during water jet cutting for the production of coupling segments can then run along the recesses. This brings about the result that the material of the elastomer body (typically a filled natural rubber mass) is laid around the metal edge of the connection flange, in each instance. In this way, the advantage is achieved that the material of the elastomer body cannot come loose from the metallic connection flange in the region of the cut edge so easily under dynamic stress on the coupling.

Further measures for optimization of the coupling segments with regard to the stresses and strains that occur in the elastomer body under dynamic stress are possible:

For example, at least one channel that runs in the radial direction of the coupling can be cut out from the elastomer body. Typically, multiple such channels are disposed distributed over the circumference of the coupling. In the sense of a uniform distribution of stresses and strains in the elastomer material, the diameter of the channel or the channels can increase from the inside to the outside, in each instance, in the radial direction of the coupling. This corresponds to the relative rotation of the drive-side flange and the power take-off-side flange under torque stress of the coupling, which increases proportionally to the radius. The cutting line during water jet cutting then preferably runs parallel to the longitudinal axis of the channel or the channels. This brings about the result that the stress and strain distribution in the elastomer body is optimized in the region of the metal edge of the connection flange produced by the cut, so that the elastomer body does not come loose from the metal under torque stress of the coupling. By means of a combination of the aforementioned radial slits with the channels that run in the radial direction of the coupling, whereby the cutting line runs through the slits and, at the same time, through the channels, an optimized geometry of the elastomer material is obtained, overall, in the coupling segments produced according to the invention.

A further possible measure consists in that the cut produced by means of water jet cutting runs at a slant to the coupling axis. By means of the slanted cut course, a pressure stress component can be produced in the region of the cut edge in the elastomer body, with torque stress on the coupling. As a result, the risk of loosening of the elastomer material from the metallic contact surfaces in the region of the cut edge is reduced. The slanted cut must be made as a function of the direction of rotation of the coupling, in order to achieve the desired effect. In this connection, the angle between coupling axis and cut direction can vary radially as a function of the distance from the axis of rotation of the coupling. This in turn corresponds to the radially increasing shear stress when the coupling is under torque stress.

Furthermore, a segmented, elastic coupling of the type mentioned initially is made available with the invention, in which, according to the invention, at least one coupling segment is produced according to the method according to one of the embodiments described above, or any desired combination of the same.

Preferably, the segmented, elastic coupling is configured as a segmented, rotationally elastic shaft coupling configured in ring shape, having at least two coupling segments disposed in the circumference direction.

Further advantages and characteristics of the present invention will be explained in greater detail in the following, using the attached figures. These show:

DETAILED DESCRIPTION OF THE PREFERRED EMBODIMENTS

Figure 1:
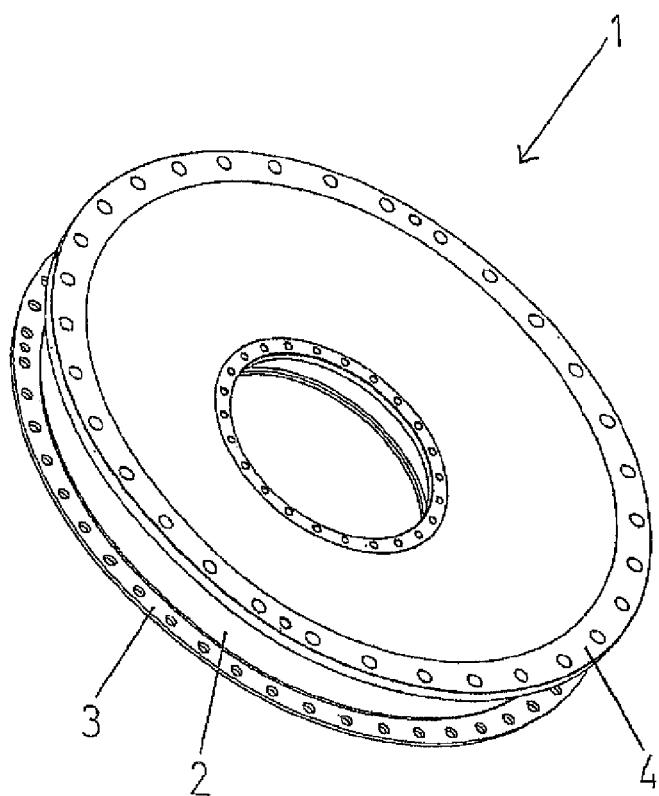
FIG. 1: a perspective representation of an exemplary embodiment of a coupling body produced in conventional manner.

FIG. 1 shows a perspective representation of an exemplary embodiment of a coupling body 1 produced in conventional manner, in the form of a rotationally elastic shaft coupling configured in ring shape. The coupling body 1 has an elastomer body 2 configured in ring shape, which is disposed between two metallic connection flanges 3 and 4 configured in ring shape. The elastomer body 2 and the two connection flanges 3 and 4 are oriented coaxial to one another. The metallic connection flanges 3 and 4 have been produced in advance, using a casting method. The elastomer body 2 is connected with the connection flanges 3 and 4 with material fit and so as to transfer torque, by means of vulcanization.

Figure 2:
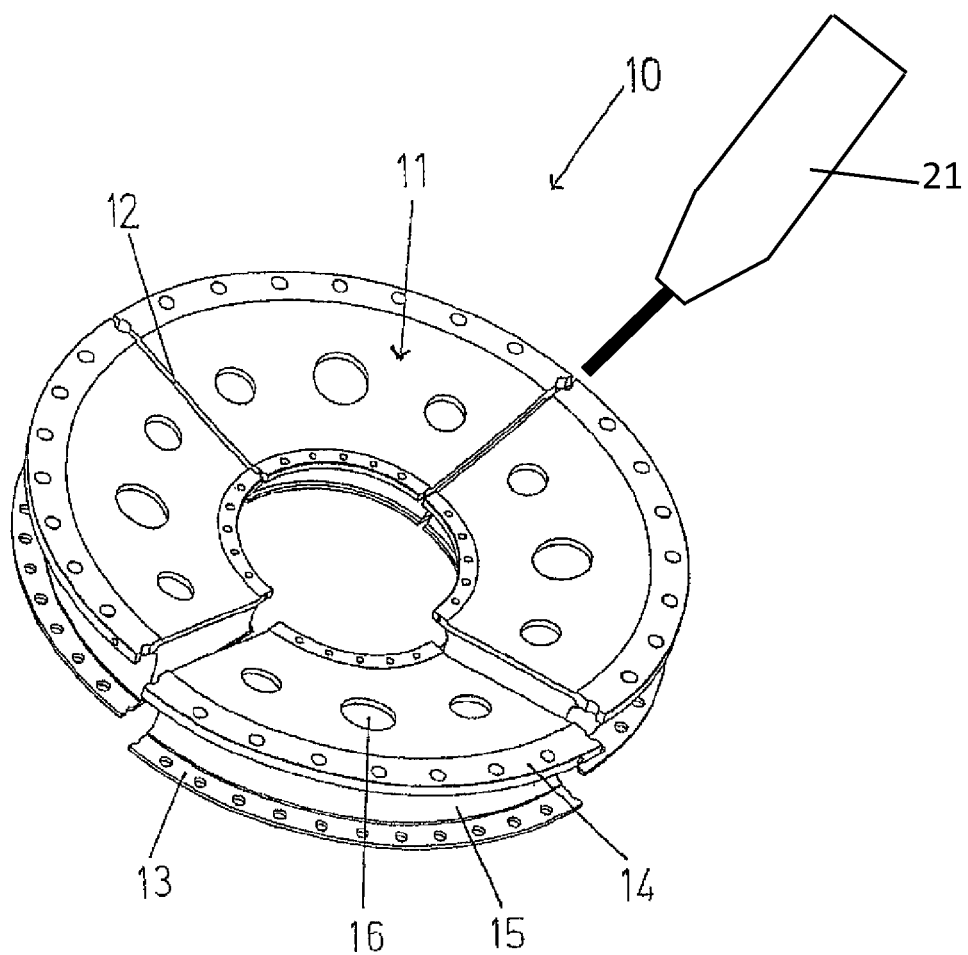
FIG. 2: a perspective representation of the rotationally elastic shaft coupling shown in FIG. 1, after the method according to the invention has been carried out.

FIG. 2 shows a perspective representation of the coupling body 1 shown in FIG. 1, after the method according to the invention has been carried out, causing a segmented, elastic coupling 10 in the form of a rotationally elastic shaft coupling configured in ring shape to be produced, which has four coupling segments 11 disposed one behind the other in the circumference direction. In the production of this segmented, elastic coupling 10, the coupling body 1 shown in FIG. 1 was divided into the four coupling segments 11 by means of a water jet cutter 21 performing water jet cutting in the form of radial cuts 12.

Each coupling segment 11 has two connection flange segments 13 and 14, between which an elastomer body segment 15 is disposed. Furthermore, three continuous, axial ventilation openings 16 are formed on each coupling segment 11 by means of water jet cutting. The continuous, axial ventilation openings 16 have different diameters, whereby the two end-side ventilation openings 16 have the same diameter, and the center ventilation opening 16 has a greater diameter. The continuous, axial ventilation openings 16 can be introduced into the individual coupling segments 11 before the coupling body 1 shown in FIG. 1 is cut up, by means of water jet cutting, or also afterward. In the sense of a uniform distribution of stresses and strains in the elastomer material, the diameter of the channel or the channels can also increase from the inside to the outside, in each instance, in the radial direction of the coupling.

Figure 3:
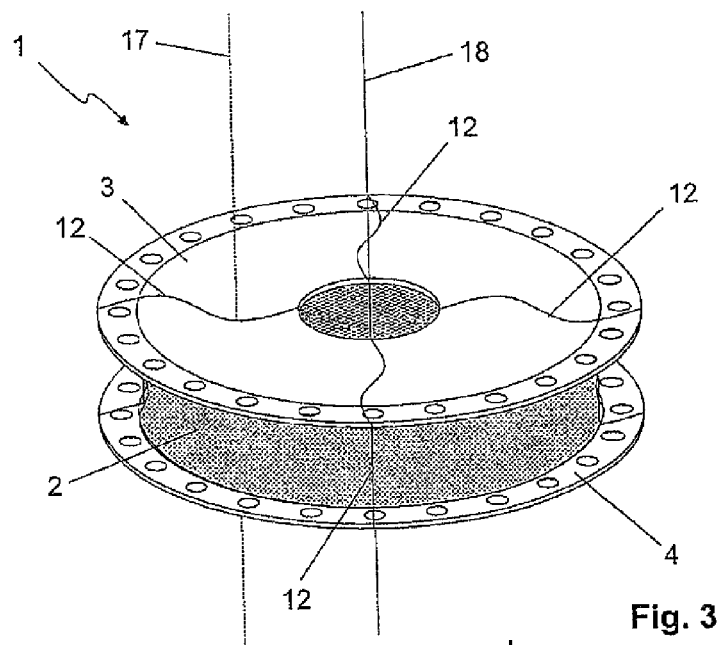
FIG. 3: a perspective representation of an exemplary embodiment of a segmented, rotationally elastic shaft coupling produced according to the invention, with a curved cutting line during water jet cutting.

FIG. 3 shows an exemplary embodiment in which the coupling body 1 is divided into segments by means of four radial cuts 12. The radial cuts 12 have a curve-shaped progression, whereby the cut direction 17, illustrated by the broken line in FIG. 3, runs parallel to the coupling axis 18.

Figure 4:
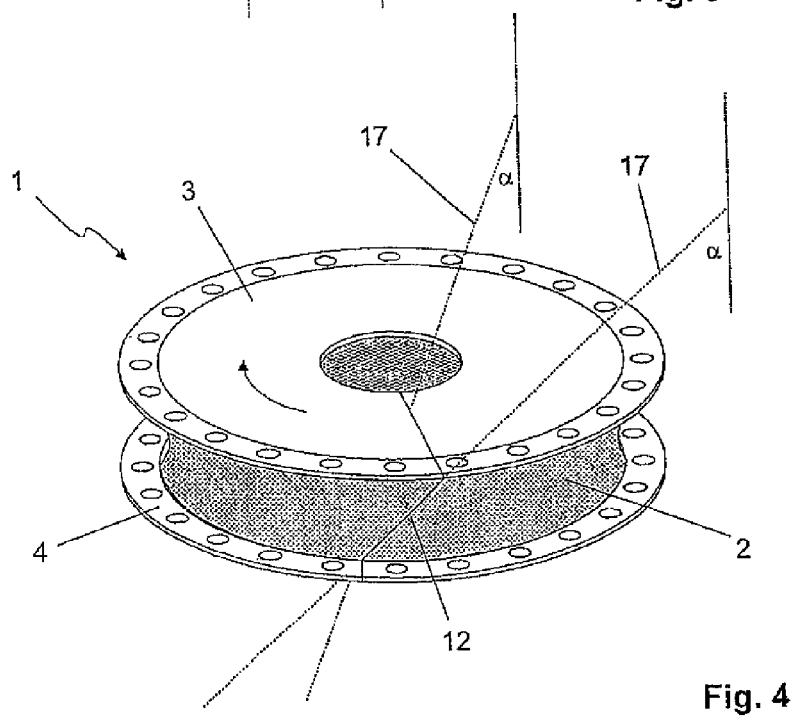
FIG. 4: a perspective representation of an exemplary embodiment of a segmented, rotationally elastic shaft coupling produced according to the invention, with a variable cutting angle during water jet cutting.

In the exemplary embodiment shown in FIG. 4, the cut 12 produced by means of water jet cutting runs at a slant to the coupling axis, whereby the angle a between coupling axis 18 and cut direction 17 varies radially, i.e. as a function of the distance from the axis of rotation of the coupling. Toward the axis of rotation of the coupling, the angle α decreases continuously. In this way, the result can be achieved that under torque stress of the finished coupling, which brings about a relative rotation of the connection flange 3 relative to the connection flange 4 in the direction of the arrow indicated in FIG. 4, a pressure stress component is produced in the elastomer body, in the region of the cut edge 12, and thereby the risk of loosening of the elastomer material from the metallic connection flanges 3, 4 in the region of the cut edge is reduced. In FIG. 4, for the sake of clarity, only a single cut 12 is shown. It is understood that multiple cuts are disposed distributed over the circumference of the coupling body 1, in order to produce the coupling segments.

Figure 5:
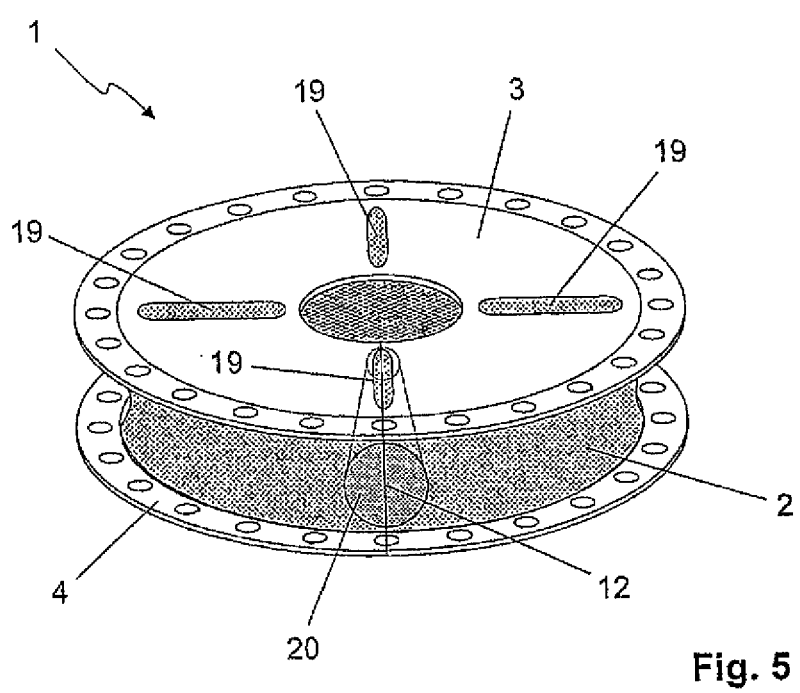
FIG. 5: a perspective representation of a further exemplary embodiment of a segmented, rotationally elastic shaft coupling produced according to the invention.

In the exemplary embodiment according to FIG. 5, the connection flanges 3 and 4 have recesses in the form of radial slits 19 closed on the end side. The elastomer body 2 passes through the radial slits 19. The cut 12 runs, as indicated in FIG. 5, through the slits 19, so that the material of the elastomer body 2 is laid around the metal edges of the connection flanges 3, 4 in the region of the cuts 12. Furthermore, in the exemplary embodiment shown in FIG. 5, a cone-shaped channel 20 that runs in the radial direction is cut out of the elastomer body 2. As can be seen in FIG. 5, the cutting line runs parallel to the longitudinal axis of the channel 20 during water jet cutting. This brings about the result that the material of the elastomer body 2 runs more or less tangentially toward the connection flange 3, 4 in the region of the cut edge. In turn, by means of this shaping, the result is achieved that the material of the elastomer body 2 does not tear under torque stress of the finished coupling, and does not come loose from the metallic connection flanges 3, 4 in the region of the segment edges. In FIG. 5, as well, only a single cut 12 is indicated for the sake of clarity. It is understood that multiple cuts must be disposed distributed over the circumference of the coupling body 1, in order to obtain the coupling segments in the desired shape and number.

The invention claimed is:

1. Method for the production of a coupling segment of a segmented, elastic coupling, wherein an elastomer body is disposed between two metallic connection flanges, and the elastomer body is connected with the two metallic connection flanges in material-fit manner, via vulcanization, to form a coupling body, wherein the coupling segment is cut out from the coupling body via water jet cutting, and wherein the water jet cuts the elastomer body and at least one of the two connection flanges.

2. Method according to claim 1, wherein at least one axial ventilation opening that runs through the entire coupling segment is formed on the coupling segment via water jet cutting, which at least one axial ventilation opening extends from one connection flange to the other.

3. Method according to claim 1, wherein the elastomer body configured in ring shape and the two metallic connection flanges configured in ring shape are connected to form the coupling body, via vulcanization.

4. Method according to claim 3, wherein the coupling segment is produced via at least two radial cuts on the coupling body.

5. Method according to claim 1, wherein the two metallic connection flanges have recesses through which the elastomer body passes.

6. Method according to claim 5, wherein the recesses are radial slits closed on the end side.

7. Method according to claim 5, wherein the cutting line during water jet cutting runs through the recesses.

8. Method according to claim 1, wherein at least one channel that runs in the radial direction of the coupling is cut out of the elastomer body.

9. Method according to claim 8, wherein the diameter of the channel increases from the inside to the outside in the radial direction of the coupling.

10. Method according to claim 8, wherein the cutting line during water jet cutting runs parallel to the longitudinal axis of the channel.

11. Method according to claim 1, wherein the cut produced via water jet cutting runs at a slant to the coupling axis.

12. Method according to claim 11, wherein the angle between the coupling axis and a cut direction varies radially.

* * * * *